United States Patent
Kanai et al.

(10) Patent No.: US 12,314,749 B2
(45) Date of Patent: May 27, 2025

(54) INFORMATION PROCESSING APPARATUS, INFORMATION PROCESSING METHOD, AND RECORDING MEDIUM

(71) Applicant: KABUSHIKI KAISHA TOSHIBA, Tokyo (JP)

(72) Inventors: Jun Kanai, Inagi Tokyo (JP); Tatsuya Uehara, Kawasaki Kanagawa (JP); Fumihiko Sano, Kawasaki Kanagawa (JP); Hiroyoshi Haruki, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 553 days.

(21) Appl. No.: 17/687,593

(22) Filed: Mar. 4, 2022

(65) Prior Publication Data

US 2022/0398120 A1    Dec. 15, 2022

(30) Foreign Application Priority Data

Jun. 9, 2021   (JP) ................. 2021-096765

(51) Int. Cl.
*G06F 9/455*   (2018.01)
*G06F 11/30*   (2006.01)
*G06F 11/32*   (2006.01)

(52) U.S. Cl.
CPC ........ *G06F 9/45558* (2013.01); *G06F 11/301* (2013.01); *G06F 11/32* (2013.01); *G06F 2009/45562* (2013.01); *G06F 2009/45591* (2013.01)

(58) Field of Classification Search
CPC .... G06F 9/45558; G06F 11/301; G06F 11/32; G06F 2009/45562; G06F 2009/45591
See application file for complete search history.

(56) References Cited

U.S. PATENT DOCUMENTS

| | | | |
|---|---|---|---|
| 9,386,039 B2 | 7/2016 | Sasaki | |
| 11,132,467 B2 | 9/2021 | Komatsubara et al. | |
| 2015/0121027 A1* | 4/2015 | Koike | G06F 9/545 |
| | | | 711/163 |
| 2019/0286833 A1* | 9/2019 | Takumi | H04L 9/3236 |

(Continued)

FOREIGN PATENT DOCUMENTS

| | | |
|---|---|---|
| JP | 5126447 B1 | 1/2013 |
| JP | 5423063 B2 | 2/2014 |
| JP | 5920668 B2 | 5/2016 |

(Continued)

*Primary Examiner* — Dong U Kim
(74) *Attorney, Agent, or Firm* — Finnegan, Henderson, Farabow, Garrett & Dunner, LLP (57) ABSTRACT

An information processing apparatus includes one or more managers that manage one or more virtual environments, and a management controller that controls the one or more managers. When the execution of the software is detected in any of the one or more virtual environments, the management controller instructs the manager that manages the detected virtual environment to determine whether to execute the software in the detected virtual environment. The manager reads a file stored in the detected virtual environment, and determines whether to execute the software in the detected virtual environment based on information indicated in the file.

18 Claims, 5 Drawing Sheets

(56) References Cited

U.S. PATENT DOCUMENTS

2020/0167473 A1\* 5/2020 Polyakov ................ G06F 21/54
2022/0050727 A1 2/2022 Kantake et al.

FOREIGN PATENT DOCUMENTS

| JP | 2019-66926 A | 4/2019 |
| JP | 2020-46829 A | 3/2020 |
| JP | 6840063 B2 | 3/2021 |
| JP | 2022-32285 | 2/2022 |

\* cited by examiner

FIG. 1

| PATH OF ALLOWED SOFTWARE | HASH VALUE |
|---|---|
| /bin/ls | 0xaaaabbbbccccdddd |
| /bin/ sh | 0xeeeeffff00001111 |
|  |  |

FIG. 2

| IDENTIFIER OF VIRTUAL ENVIRONMENT | IDENTIFIER OF MANAGEMENT UNIT | TIME |
|---|---|---|
| Abcdef | 1234 | 2021/04/20 10:00:50 |
| Ghijkl | 3242 | 2021/04/20 11:00:10 |
|  |  |  |

INFORMATION PROCESSING APPARATUS, INFORMATION PROCESSING METHOD, AND RECORDING MEDIUM

CROSS REFERENCE TO RELATED APPLICATIONS

This application is based upon and claims the benefit of priority from the prior Japanese Patent Application No. 2021-096765, filed on Jun. 9, 2021, the entire contents of which are incorporated herein by reference.

FIELD

Embodiments in the present disclosure relates to an information processing apparatus, an information processing method, and a recording medium.

BACKGROUND

As one of virtualization technologies, there is a container type virtualization technology. In the container type virtualization technology, execution of an application in a virtual environment (container) is controlled by a host operating system (OS). For example, when an application is about to be executed in the virtual environment, a call (system call) is made to the kernel of the host OS, and the kernel processes the system call, so that the application operates. Therefore, in the container type virtualization technology, a plurality of virtual environments shares a resource of a host environment.

However, there are many demands that it is desired to change the execution authority of the application for each virtual environment. For this purpose, the host environment is required to check in which virtual environment the application has been executed at the time of executing the application, and determine whether to permit execution of the application based on the setting (in other words, the security policy) regarding the security of the checked virtual environment.

For convenience of management or the like, there may be a case where it is desired to store the file indicating the setting related to security in the virtual environment instead of the host. In this case, it is necessary for the host to read the file. When unauthorized processing is performed on the file in the virtual environment, a problem may occur in the host environment. Therefore, such an act may be a factor of vulnerability.

DETAILED DESCRIPTION

An information processing apparatus according to an embodiment of the present disclosure includes one or more managers configured to manage one or more virtual environments; and a management controller configured to control the one or more managers, wherein when execution of software is detected in any of the one or more virtual environments, the management controller instructs a manager that manages a detected virtual environment to determine whether to execute the software in the detected virtual environment, and the manager reads a file stored in the detected virtual environment to determine whether to execute the software in the detected virtual environment based on information indicated in the file.

Hereinafter, embodiments of the present disclosure will be described with reference to the drawings.

AN EMBODIMENT OF THE PRESENT DISCLOSURE

Figure 1:
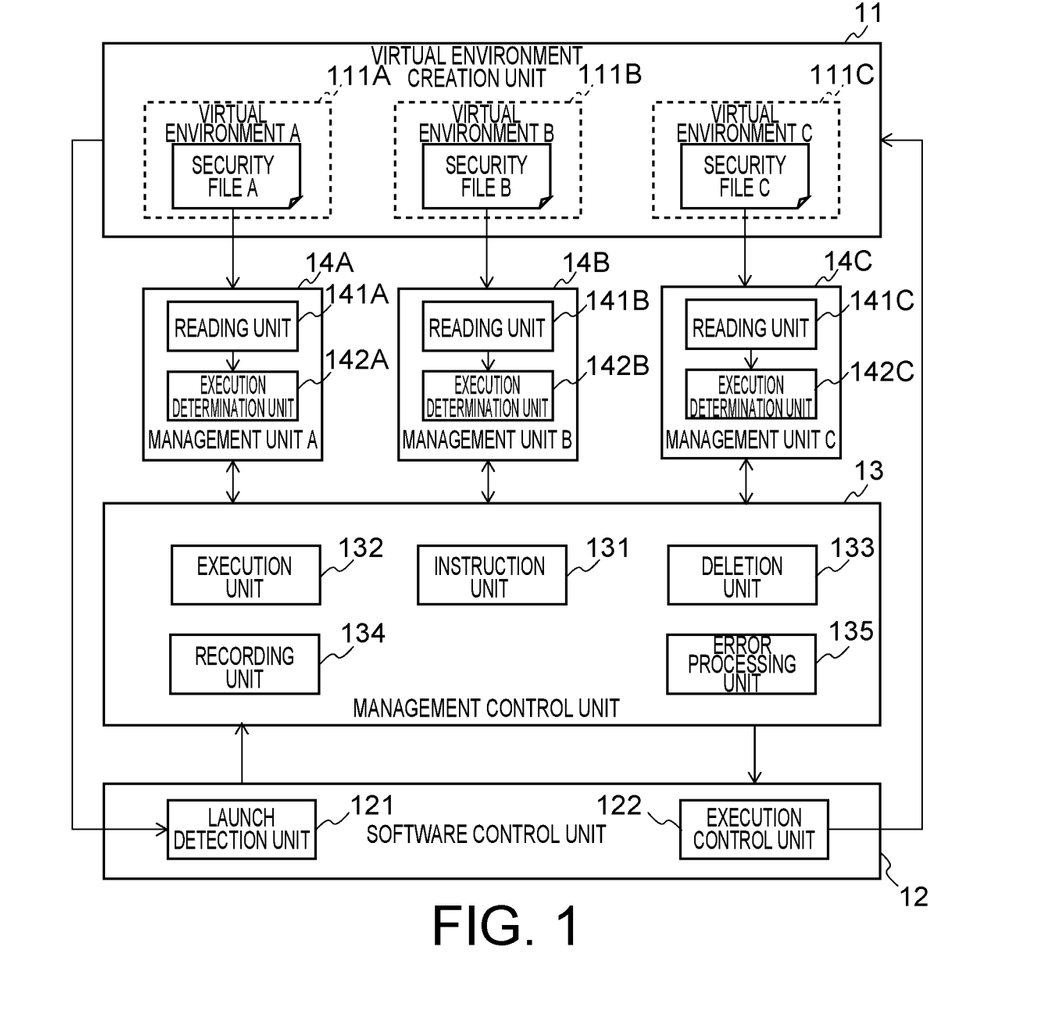
FIG. 1 is a block diagram showing an example of an information processing apparatus according to an embodiment of the present disclosure.

FIG. 1 is a block diagram showing an example of an information processing apparatus according to an embodiment of the present disclosure. An information processing apparatus 1 according to the first embodiment includes a virtual environment creation unit 11, a software control unit 12, a management control unit 13, a management unit 14, and a storage unit. Note that the storage unit is not illustrated for convenience. The software control unit 12 includes a launch detection unit 121 and an execution control unit 122. The management control unit 13 includes an instruction unit 131, an execution unit 132, a deletion unit 133, a recording unit 134, and an error processing unit 135. The management unit 14 includes a reading unit 141 and an execution determination unit 142. Note that alphabets of reference numerals in FIG. 1 are used to distinguish the same components.

Note that the components illustrated in FIG. 1 are for describing the process of the present embodiment, and other components may be present. Further, the components illustrated in FIG. 1 may be divided into a plurality of parts, or a plurality of components may be combined into one.

The information processing apparatus 1 of the present embodiment is an apparatus capable of providing one or more virtual environments. Implementation and provision of the virtual environment may be similar to those in the conventional method, and for example, it is possible to generate the virtual environment using a predetermined virtual environment image file. The virtual environment image file may be stored in advance in the storage unit of the information processing apparatus 1, or may be acquired from a repository server that provides the virtual environment image file when the virtual environment is realized.

Note that the virtual environment image file includes a file related to the virtual environment, and may include, for example, a virtual environment setting file, a virtual environment security file, a virtual environment file, and the like. The virtual environment setting file is a file in which information necessary for executing the virtual environment is described. For example, the name of the OS and the name of the software executed in the virtual environment are described. The virtual environment security file indicates information about security of the virtual environment. The virtual environment security file may be, for example, a permission list indicating programs that are permitted for execution in the virtual environment or a non-permission list indicating programs that are prohibited from being executed in the virtual environment. Hereinafter, the virtual environment security file is simply referred to as a security file. The virtual environment file is a file executed in the virtual environment, such as a shared library, a script file, or a software setting file. The information processing apparatus 1 generates the virtual environment by deploying these files included in the virtual environment image file in the storage unit.

In the virtual environment generated by the information processing apparatus 1, software can be executed. However, the information processing apparatus 1 detects launch of software in the virtual environment, and checks, based on the security file, whether the software may be executed. Then, the software that is confirmed to be executable is executed, and the software that is confirmed not to be executable is terminated. By performing execution control of software in the virtual environment in this manner, the virtual environment is protected.

Note that, although software is also referred to as an application depending on the use and the like, the term software is used without distinguishing them in the present disclosure. That is, the application is included in the software.

Note that the software of the virtual environment uses a resource of the host environment such as a kernel, a device driver, and the like for execution. Therefore, it is possible to detect and control execution of software.

In the present embodiment, software that may be executed can be changed for each virtual environment. Therefore, the security file is prepared for each virtual environment. In addition, it is assumed that the security file is stored in the virtual environment.

Processing of each component of the information processing apparatus 1 will be described.

The virtual environment creation unit 11 creates a virtual environment 111 by deploying the virtual environment image file in the storage unit. For example, in a case where the container type virtualization technology is used, the virtual environment creation unit 11 corresponds to a container engine, and the virtual environment 111 corresponds to a container. Note that the virtualization technology used by the information processing apparatus 1 is not limited to the container type virtualization technology, and a virtualization technology capable of performing similar processing may be used. The generated virtual environment may be a plurality of virtual environments 111A to 111C illustrated in FIG. 1, or may be one virtual environment.

The virtual environment image file may be different for each virtual environment 111, and the virtual environment creation unit 11 may deploy the virtual environment image file designated by the user or may select one from a plurality of virtual environment image files based on the information from the user. As such, the generated virtual environments 111 may be different from each other. In addition, since the security file in each virtual environment 111 may also be different, a plurality of virtual environments 111 having different security levels may exist at the same time.

The software control unit 12 controls software executed in the virtual environment 111. When the software is executed in the virtual environment 111, the launch detection unit 121 of the software control unit 12 detects the execution. The detection can be realized by various means. For example, execution of software can be detected using an OS mechanism called a hook.

Note that since the virtual environment 111 is generated by executing software, the software control unit 12 can also detect the generation of the virtual environment 111. Note that the generation of the virtual environment 111 may be detected not by the software control unit 12 but by the management control unit 13.

In addition, the launch detection unit 121 acquires information about the detected software. For example, similarly to the software detection method, information such as a path of the software and an identifier of the virtual environment 111 in which the software is executed can be acquired using the hook. The acquired information about the software is transmitted to the management control unit 13 and the management unit 14, and is used for determination of whether to execute the software.

Figure 2:
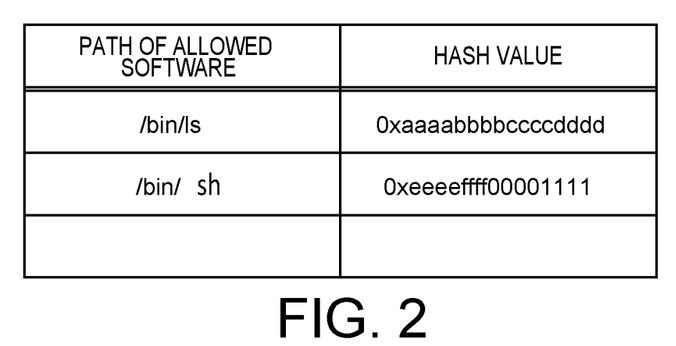
FIG. 2 is a diagram illustrating an example of information used for determining whether to execute software.

FIG. 2 is a diagram illustrating an example of information used to determine whether to execute software. In the example of FIG. 2, a software path and a software hash value are illustrated. The software hash value is generated based on software information such as a path. Note that the generation of the hash value may be performed by the software control unit 12 or may be performed by the management control unit 13 or the management unit 14.

The execution control unit 122 of the software control unit 12 controls the execution of the software in the virtual environment 111 based on the result of the determination as to whether to execute the software. That is, in a case where the software executed in the virtual environment 111 is determined to be inappropriate, the execution of the software is terminated, and in a case where the software executed in the virtual environment 111 is determined to be appropriate, the execution of the software is not terminated. Note that the software control unit 12 may temporarily stop the software in order to determine whether the software should be executed in the middle of the execution process of the software.

The management control unit 13 and the management unit 14 manage the virtual environment 111, and when software information is transmitted from the software control unit 12, in other words, when execution of the software is detected in any of the one or more virtual environments 111, perform determination of whether to execute the software and processing for the determination.

The management control unit 13 controls the management unit 14 and manages the virtual environment 111 via the management unit 14. For example, when the execution of the software is detected in any of the one or more virtual environments 111, the instruction unit 131 of the management control unit 13 instructs the management unit 14 that manages the detected virtual environment 111 to determine whether to execute the software in the detected virtual environment 111.

The management unit 14 manages the virtual environment 111 associated in advance. The virtual environment 111 and the management unit 14 are basically associated on a one-to-one basis. Although the management unit 14 can manage the plurality of virtual environments 111, it is preferable that the number of virtual environments 111 managed by one management unit 14 be small from the viewpoint of securing the stability of the operation of each virtual environment 111. For example, when a management unit 14A manages the virtual environment 111A and the virtual environment 111B, when a failure occurs in the management unit 14A due to the virtual environment 111A, the irrelevant virtual environment 111B is affected. Conversely, in a case where the management unit 14A manages the virtual environment 111A and the management unit 14B manages the virtual environment 111B, even when malicious software such as malware performs an attack such as illegally modifying a security file in the virtual environment 111A, it is also possible to take a measure such as keeping the damage of the attack only in the management unit 14A.

Therefore, the execution unit 132 of the management control unit 13 generates the management unit 14. In other words, it generates a process corresponding to the management unit 14. For example, at the time when the generation of the virtual environment 111 is detected by the software control unit 12, the execution unit 132 may newly generate the management unit 14 that manages the generated virtual environment 111. Alternatively, the execution unit 132 may generate the management unit 14 that manages the detected virtual environment 111 when it is determined that there is no management unit 14 that manages the detected virtual environment 111.

However, when the management unit 14 is generated for each virtual environment 111, the number of the management units 14 increases depending on the number of virtual environments 111. When there are a large number of management units 14, the load on the information processing apparatus 1 increases. In other words, since a process corresponding to the management unit 14 consumes resources such as a memory and a computing processor unit (CPU) usage rate of the information processing apparatus 1 only with their existence, when a large number of processes corresponding to the management unit 14 are present, resources are exhausted. Therefore, it is preferable that the management unit 14 exists only during a period in which management for the virtual environment 111 is necessary. Therefore, it is preferable that the execution unit 132 does not generate the management unit 14 that manages the virtual environment 111 at the time when the virtual environment 111 is generated, and generates the management unit 14 that manages the virtual environment 111 at the time when it is determined that there is no management unit 14 that manages the detected virtual environment 111.

Similarly, in a case where it is determined that management for the virtual environment 111 is unnecessary, it is preferable to delete the management unit 14 that manages the virtual environment 111 and release the resource of the information processing apparatus 1. Therefore, the deletion unit 133 of the management control unit 13 may delete the management unit 14 satisfying the predetermined condition. The condition may be appropriately determined based on the specification of the information processing apparatus 1, the required specification, and the like. For example, in a case where it is detected that the virtual environment 111 has been deleted, or in a case where it is recognized that a failure has occurred in the virtual environment 111, the deletion unit 133 may delete the management unit 14 that manages the virtual environment 111. In addition, deletion of the management unit 14 in which a period in which the determination is not made exceeds a predetermined time length may be performed.

In addition, when the number of the management units 14 exceeds the upper limit, at least one of the management units 14 is selected and the selected management unit 14 is deleted, so that the number of the management units 14 may be suppressed to the upper limit or less. The selection criteria may be appropriately determined. For example, the recording unit 134 of the management control unit 13 may record the time when the determination is made, and delete the management unit 14 having the longest period in which the determination is not made. As a result, the resource of the information processing apparatus 1 may be prevented from falling below the lower limit. The upper limit may be appropriately determined according to the specification of the information processing apparatus 1.

The deletion of the virtual environment 111 can be detected by the software control unit 12 as in the generation of the virtual environment 111. Furthermore, for example, the process of the information processing apparatus 1 is monitored, and it is detected that the process corresponding to the virtual environment 111 recognized at the time of generating the virtual environment 111 has ended, so that the deletion of the virtual environment 111 may be detected. Furthermore, for example, in a case where the virtual environment 111 uses the namespace function of the OS, it may be detected that the namespace corresponding to the virtual environment 111 recognized at the time of generation of the virtual environment 111 has been deleted. In addition, it may be periodically checked whether the virtual environment image file deployed for generating the virtual environment 111 has been deleted. Note that instead of the software control unit 12, the management control unit 13 may detect the deletion of the virtual environment 111. In addition, the management unit 14 may periodically perform vital monitoring such as periodic communication on the virtual environment 111 to be managed, and check whether there is a problem in the virtual environment 111.

Figure 3:
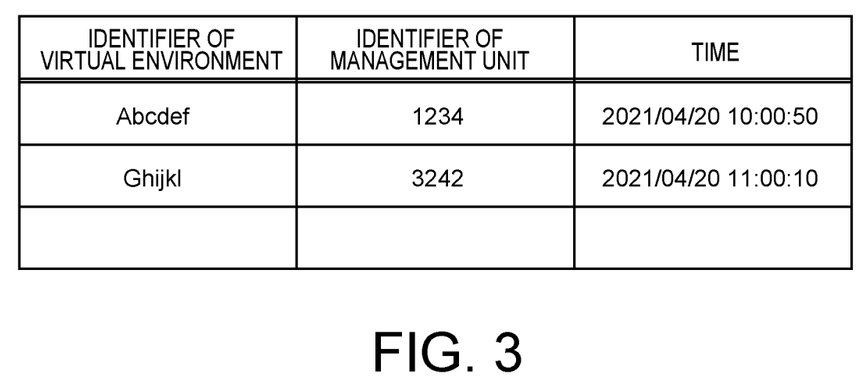
FIG. 3 is a diagram illustrating an example of data indicating a correspondence relationship between a management unit and a virtual environment.

The correspondence relationship between the management unit 14 and the virtual environment 111 is recorded by the recording unit 134 in data indicating the correspondence relationship between the management unit 14 and the virtual environment 111. FIG. 3 is a diagram illustrating an example of data indicating a correspondence relationship between the management unit 14 and the virtual environment 111. The table in the example of FIG. 3 indicates an identifier indicating the virtual environment 111 and an identifier indicating the management unit 14, and the virtual environment 111 and the management unit 14 included in the same row are in a correspondence relationship. Note that, in the example of FIG. 3, the time at which the above-described determination is made is also recorded in association with the management unit 14. Note that the time may be recorded in another data.

The data indicating the correspondence relationship between the management unit 14 and the virtual environment 111 is used to identify the corresponding management unit 14 from the virtual environment 111. When the execution of the software is detected and the information about the software is received from the software control unit 12, the instruction unit 131 of the management control unit 13 refers to the data indicating the correspondence relationship and identifies the management unit 14 that manages the virtual environment 111 in which the execution of the software is detected. Therefore, the information about the software transmitted from the software control unit 12 includes information that can identify the virtual environment 111 such as an identifier of the virtual environment 111 so that the management control unit 13 can select the management unit 14.

In addition, the recording unit 134 edits the data indicating the correspondence relationship at the time of generation and deletion of the management unit 14. At the time of generation of the management unit 14, as illustrated in FIG. 3, the identifier indicating the generated management unit 14 is recorded in the data so that the correspondence relationship with the identifier of the corresponding virtual environment 111 can be recognized. At the time of deleting the management unit 14, the identifier indicating the deleted management unit 14 is deleted from the data.

The reading unit 141 of the management unit 14 accesses the security file of the virtual environment 111 to be managed, and reads information about the security of the virtual environment 111. Furthermore, when software is executed in the virtual environment 111, the execution determination unit 142 of the management unit 14 determines, based on the security file, whether execution of the software is permitted or not. For example, the determination can be made based on whether a path indicated in the software information from the management control unit 13 matches a path indicated in the security file. In addition, a hash value is calculated based on the information acquired from the virtual environment 111, and compared with a hash value indicated in the software information from the management control unit 13, and it is possible to make the determination. Therefore, the information about the software transmitted from the software control unit 12 includes information necessary for making a determination, such as a software path.

Note that a case where the determination by the management unit 14 is not normally made is also assumed. Therefore, the error processing unit 135 of the management control unit 13 performs an error process when the determination by the management unit 14 is not normally made. It is assumed that there are various causes for which the determination by the management unit 14 has not been made normally, but the cause is not particularly limited, and the error process may be performed simply in a case where the determination result cannot be acquired from the management unit 14 within a predetermined time. The error processing unit 135 may transmit an error to the outside such as the software control unit 12, for example. In addition, the error processing unit 135 may make a determination instead of the management unit 14. For example, any virtual environment 111 may determine that only predetermined software is permitted and the others are rejected. Alternatively, it may be determined that any software is uniformly permitted or not permitted. Note that, also in a case where the determination is made on behalf of the management unit 14, the determination result may be different for each virtual environment 111. In this way, the management unit 14 or the management control unit 13 returns the determination result to the software control unit 12, so that the execution of the software in the virtual environment 111 can be controlled.

Figure 4:
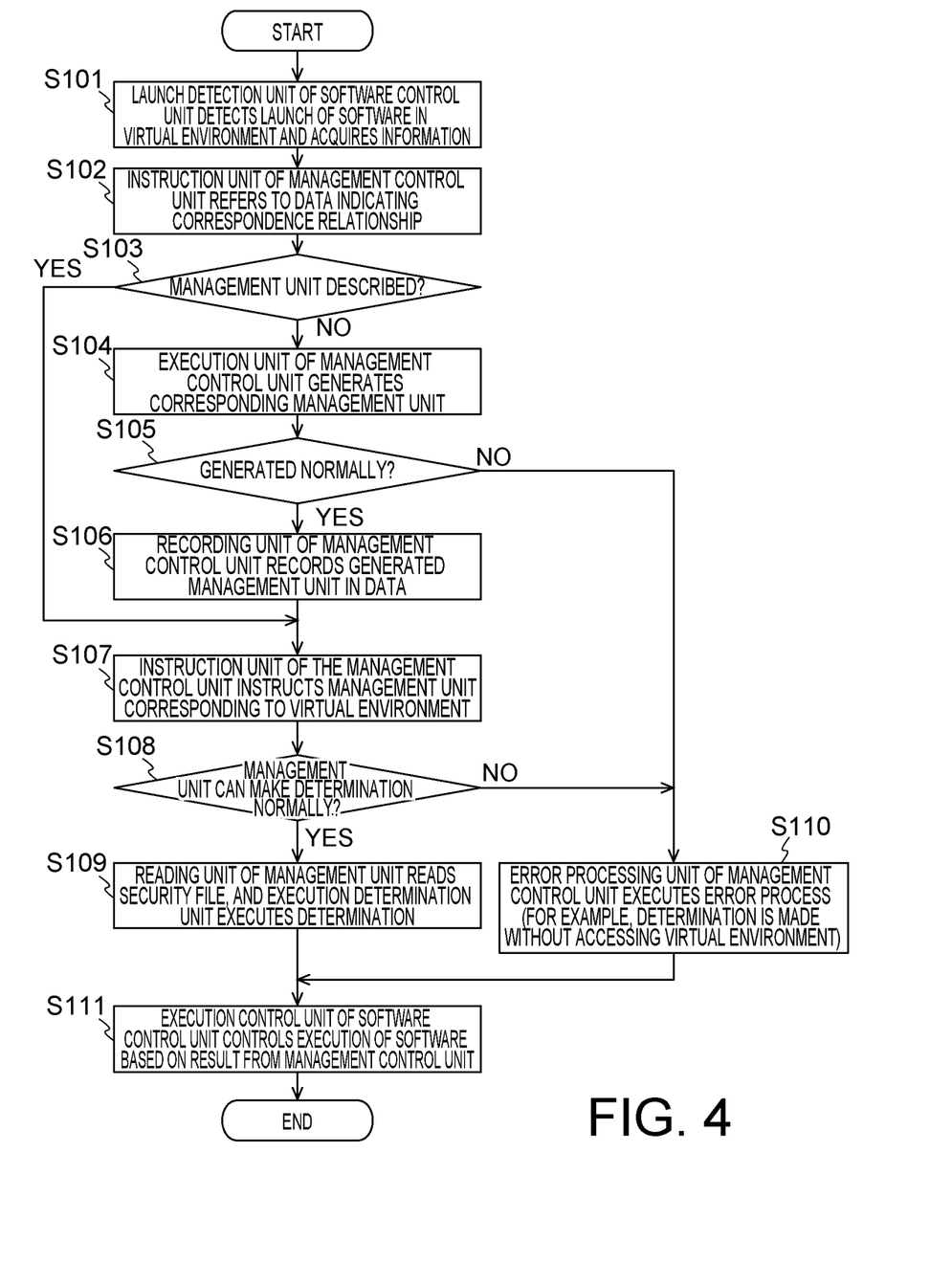
FIG. 4 is a schematic flowchart of processing related to execution control of software.

Next, a flow of each process of the information processing apparatus 1 will be described. FIG. 4 is a schematic flowchart of processing related to execution control of software.

The launch detection unit 121 of the software control unit 12 detects execution of software in the virtual environment 111 and acquires information such as an identifier of the virtual environment 111 and a software path (S101). The instruction unit 131 of the management control unit 13 refers to the data indicating the correspondence relationship and checks whether there is the management unit 14 that manages the detected virtual environment 111 (S102).

When the management unit 14 is not described in the data (NO in S103), the management control unit 13 performs the generation process of the corresponding management unit 14 (S104). When the corresponding management unit 14 is normally generated (YES in S105), the recording unit 134 of the management control unit 13 records the generated management unit 14 in the data (S106). When the corresponding management unit 14 is not normally generated (NO in S105), an error process to be described later is performed (S110).

When the management unit 14 is described (YES in S103) and after the recording of the generated management unit 14 (S106) is performed, the instruction unit 131 of the management control unit 13 instructs the management unit 14 corresponding to the detected virtual environment 111 to determine whether to execute software (S107).

When the management unit 14 can make a determination normally (YES in S108), the reading unit 141 of the management unit 14 accesses the virtual environment 111 and reads the security file, and the execution determination unit 142 of the management unit 14 determines whether to execute software based on the security file (S109). The determination result is passed to the software control unit 12 via the management control unit 13.

On the other hand, when the corresponding management unit 14 has not been generated normally (NO in S105) or when the management unit 14 has not been able to make a determination normally (NO in S108), the error process is performed (S110). For example, a case where there is no response from the management unit 14, a case where a response indicating that the access to the virtual environment 111 failed has been received from the management unit 14, a case where a response indicating that the security file of the virtual environment 111 was not read has been received from the management unit 14, and the like are included in a case where the management unit 14 was not able to make a determination normally.

As the error process, for example, whether to execute software may be determined instead of the management unit 14. Alternatively, an error may be simply returned without determining whether to execute the software. The result of the error process is passed to the software control unit 12.

In the error process, an instruction such as the determination (S107) may be executed again. Since the determination may fail due to a temporary failure caused by a processing load or the like, the error process may be performed when an error continues several times.

The execution control unit 122 of the software control unit 12 controls the execution of the software based on the result from the management control unit 13 (S111). When an error is acquired from the management control unit 13, predetermined control may be performed. In addition, in a case where an error is received, and in a case where the determination result is unexecutable, a program for outputting a warning message may be executed. Execution control is performed in this manner, and this flow ends.

Figure 5:
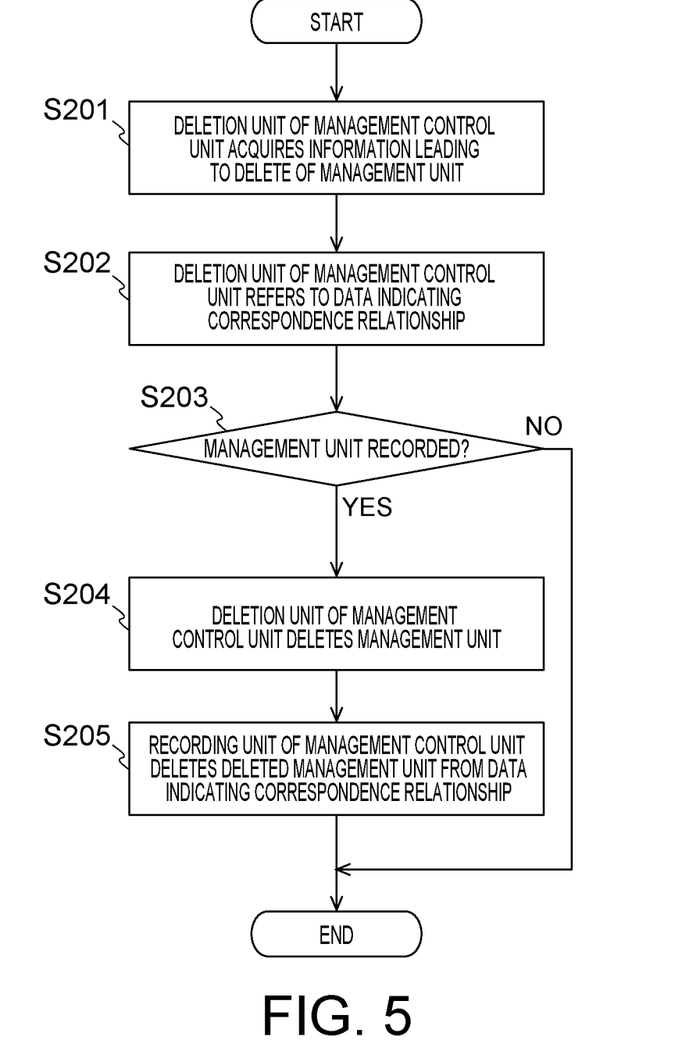
FIG. 5 is a schematic flowchart of processing related to deletion of the management unit.

FIG. 5 is a schematic flowchart of processing related to deletion of the management unit 14. First, the management control unit 13 acquires information leading to deletion of the management unit 14 (S201). The information may be, for example, information indicating that the software control unit 12 or the like has detected deletion of the virtual environment 111. In addition, it may be information indicating that the management unit 14 cannot communicate with the virtual environment 111. Furthermore, it may be information indicating that a certain period has elapsed since the access to the virtual environment 111 is no longer performed. The management control unit 13 refers to the data indicating the correspondence relationship and checks whether there is the management unit 14 that manages the detected virtual environment 111 (S102).

In a case where the management unit 14 is not described in the data (NO in S203), the management unit 14 has already been deleted, so that the flow ends. For example, this corresponds to a case where the deletion of the virtual environment 111 corresponding to the deleted management unit 14 is detected after the management unit 14 is deleted since a certain period has elapsed since the access to the virtual environment 111 is no longer performed.

When the management unit 14 is described in the data (YES in S203), the deletion unit 133 of the management control unit 13 deletes the management unit 14 (S204). Then, the management control unit 13 deletes the deleted management unit 14 from the data indicating the correspondence relationship. In this way, it is possible to suppress the consumption of resources by deleting the management unit 14 that is unnecessary, and it is possible to prevent a problem from occurring in the determination of whether to perform the software by updating the data indicating the correspondence relationship.

As described above, the information processing apparatus 1 according to the present embodiment can individually change the security policies of the plurality of virtual environments 111. Furthermore, in the present embodiment, the management unit 14 is generated for each virtual environment. As a result, for example, it is possible to prevent a problem caused by an unauthorized process being performed on a security file stored in a certain virtual environment from affecting the management of another virtual environment 111. Therefore, the vulnerability is improved as compared with that of the related art. Furthermore, by performing control such that the management unit 14 exists in a period in which management is necessary, it is possible to prevent resources of the information processing apparatus 1 from being depleted.

At least part of the above embodiment may be realized by a dedicated electronic circuit (that is, hardware) such as an integrated circuit (IC) on which a processor, a memory, and the like are mounted. At least part of the above embodiment may be realized by executing software (program). For example, using a general-purpose computer device as basic hardware and causing a processor such as a CPU mounted on the computer device to execute a program, it is possible to realize the process of the above embodiments. That is, each unit illustrated in FIG. 1 can be implemented as a process.

For example, the computer can be the apparatus of the above embodiment by the computer reading dedicated software stored in a computer-readable storage medium. The type of the storage medium is not particularly limited. In addition, the computer can be the apparatus of the above embodiment by the computer installing dedicated software downloaded via the communication network. In this way, information processing by software is specifically implemented using hardware resources.

Figure 6:
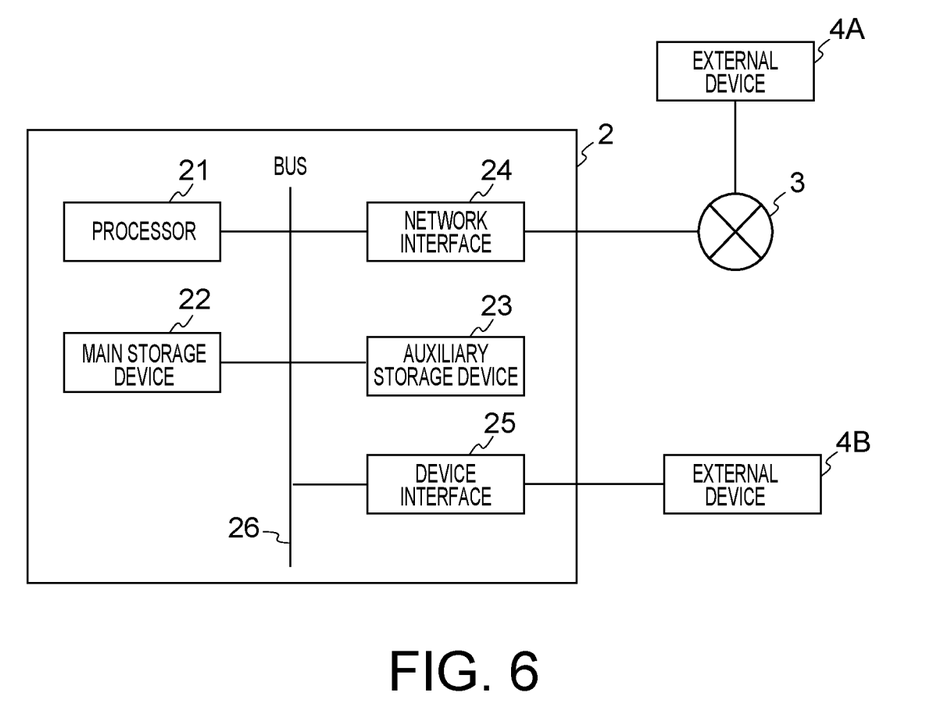
FIG. 6 is a block diagram illustrating an example of a hardware configuration according to an embodiment of the present disclosure.

FIG. 6 is a block diagram illustrating an example of a hardware configuration according to an embodiment of the present disclosure. The information processing apparatus 1 includes a processor 21, a main storage device 22, an auxiliary storage device 23, a network interface 24, and a device interface 25, and can be realized as a computer device 2 connected thereto via a bus 26. The storage unit of the information processing apparatus 1 can be implemented by the main storage device 22 or the auxiliary storage device 23, and the components such as the management control unit 13 can be implemented by the processor 21.

Note that the computer device 2 of FIG. 6 includes components the number of which is one, but may include a plurality of the same components. In addition, although FIG. 6 illustrates one computer device 2, software may be installed in a plurality of computer devices, and each of the plurality of computer devices may execute different partial process of the software.

The processor 21 is an electronic circuit including a control device and an arithmetic device of a computer. The processor 21 performs an arithmetic process based on data and programs input from each device or the like of the internal configuration of the computer device 2 to output a calculation result and a control signal to each device or the like. Specifically, the processor 21 executes an OS, software, or the like of the computer device 2, and controls each device constituting the computer device 2. The processor 21 is not particularly limited as long as it can perform the above processing.

The main storage device 22 is a storage device that stores instructions executed by the processor 21, various pieces of data, and the like, and information stored in the main storage device 22 is directly read by the processor 21. The auxiliary storage device 23 is a storage device other than the main storage device 22. Note that these storage devices mean any electronic component capable of storing electronic information, and may be a memory or a storage. The memory includes a volatile memory and a non-volatile memory, but may be any of them.

The network interface 24 is an interface for connecting to the communication network 3 wirelessly or by wire. As the network interface 24, a network interface conforming to an existing communication standard may be used. The network interface 24 may exchange information with an external device 4A connected for communication via the communication network 3.

The device interface 25 is an interface such as a USB directly connected to an external device 4B. The external device 4B may be an external storage medium or a storage device such as a database.

The external devices 4A and 4B may be output devices. The output device may be, for example, a display device that displays an image, a device that outputs sound or the like, or the like. Examples thereof include a liquid crystal display (LCD), a cathode ray tube (CRT), a plasma display panel (PDP), a speaker, and the like, but are not limited thereto.

Note that the external devices 4A and 4B may be input devices. The input device includes devices such as a keyboard, a mouse, and a touch panel, and provides information input by these devices to the computer device 2. A signal from the input device is output to the processor 21.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An information processing apparatus comprising at least one processor configured to function as:
   one or more managers, each of the one or more manages configured to manage a corresponding one of one or more virtual environments; and
   a management controller configured to control the one or more managers,
   wherein:
     in response to detecting a launch of software in any of the one or more virtual environments, the management controller instructs a corresponding one of the one or more managers that manages the detected virtual environment to determine whether to permit execution of the software in the detected virtual environment, the manager that manages the detected virtual environment reads a file stored in the detected virtual environment to determine whether to permit execution of the software in the detected virtual environment based on information indicated in the file, and the one or more managers exist only during a period in which management for the virtual environment is necessary.

2. The information processing apparatus according to claim 1, wherein in response to determining that there is no manager configured to manage the virtual environment after the launch of software is detected in the detected virtual environment, the management controller generates a manager configured to manage the detected virtual environment.

3. The information processing apparatus according to claim 1, wherein in response to determining that a manager of the one or more managers satisfies a predetermined condition, the management controller deletes that manager.

4. The information processing apparatus according to claim 3, wherein in response to detecting deletion of any of the one or more virtual environments, the management controller deletes a corresponding manager that manages the deleted virtual environment.

5. The information processing apparatus according to claim 3, wherein in response to determining, for one of the one or more managers, that a period in which the determination is not made exceeds a predetermined time length the management controller deletes that manager.

6. The information processing apparatus according to claim 3, wherein in response to determining that a number of the one or more managers exceeds an upper limit, the management controller deletes a manager for which a period in which the determination is not made is longest.

7. The information processing apparatus according to claim 1, wherein in response to determining that the manager that manages the detected virtual environment fails to respond to an instruction from the management controller, the management controller outputs an error.

8. The information processing apparatus according to claim 1, further comprising:

a software controller configured to control execution of the software in determined virtual environment based on a result of the determination.

9. An information processing method comprising:

generating one or more managers that each manage a corresponding one of one or more virtual environments;

in response to detecting that a launch of software in any of the one or more virtual environments, instructing a corresponding one of the one or more managers that manages the detected virtual environment to determine whether to permit an execution of the software in the detected virtual environment;

reading, by the manager that manages the detected virtual environment, a file stored in the detected virtual environment; and determining, by the manager that manages the detected virtual environment, whether to permit the execution of the software in the detected virtual environment based on information indicated in the file, wherein the one or more managers exist only during a period in which management for the virtual environment is necessary.

10. The information processing method according to claim 9, wherein in response to determining that there is no manage configured to manage the detected virtual environment after the launch of software is detected in the detected virtual environment, the method further comprises generating a manager configured to manage the detected virtual environment.

11. The information processing method according to claim 9, wherein in response to determining that a manager of the one or more managers satisfies a predetermined condition, the method further comprises deleting that manager.

12. The information processing method according to claim 11, wherein in response to detection deletion of any of the one or more virtual environments, the method further comprises deleting a corresponding manager that manages the deleted virtual environment.

13. The information processing method according to claim 11, wherein in response to determining, for one of the one or more managers, that a period in which the determination is not made exceeds a predetermined time length the method further comprises deleting that manager.

14. The information processing method according to claim 11, wherein in response to determining that a number of the one or more managers exceeds an upper limit, the method further comprises deleting a manager for which a period in which the determination is not made is longest.

15. The information processing method according to claim 9, wherein in response to determining that if the manager that manages the detected virtual environment fails to respond to an instruction from the management controller, the method further comprises outputting an error.

16. The information processing method according to claim 9, wherein the method further comprises controlling execution of the software in determined virtual environment based on a result of the determination.

17. A non-transitory computer-readable recording medium storing a program executed by a computer, the medium causing the computer to execute a method comprising:

generating one or more managers that each manage a corresponding one of one or more virtual environments;

in response to detecting a launch of software in any of the one or more virtual environments, instructing a corresponding one of the one or more managers that manages the detected virtual environment to determine whether to permit an execution of the software in the detected virtual environment;

reading, by the manager that manages the detected virtual environment, a file stored in the detected virtual environment; and determining, by the manager that manages the detected virtual environment, whether to permit the execution of the software in the detected virtual environment based on information indicated in the file, wherein the one or more managers exist only during a period in which management for the virtual environment is necessary.

18. The non-transitory computer-readable recording medium according to claim 17, wherein
in response to determining that there is no manager configured to manage the detected virtual environment after the launch of software is detected in the detected virtual environment, the method further comprises generating a manager configured to manage the detected virtual environment.

* * * * *